CRYSTAL DEMODULATING MEANS FOR ULTRAHIGH RADIO FREQUENCIES

Filed Nov. 28, 1962

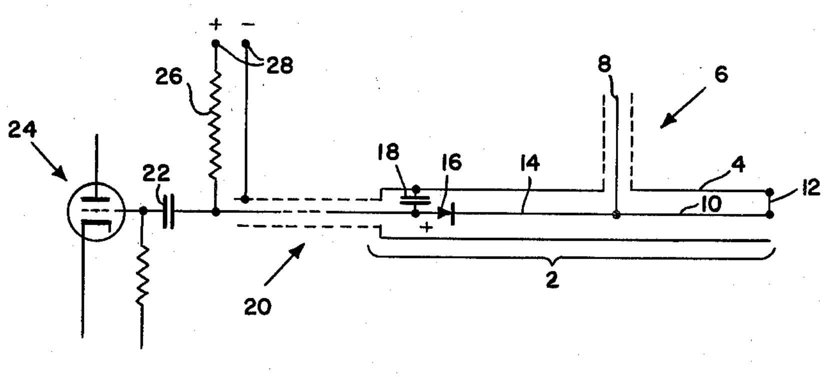

FIG. 1.

FIG. 2.

(1) $$P_{st} = \frac{8}{\alpha}\left(1 + \omega^2 C_b^2 r R_b\right)^2 \left(\frac{k T_0 t_x \Delta f_v}{R_b}\right)^{\frac{1}{2}}$$

(2) $$R_{bo} = \frac{1}{\omega_0^2 C_b^2 r}$$

(3) $$P_{st} = \frac{\omega_0 C_b}{\alpha}\left(1 + \frac{\omega^2}{\omega_0^2}\right)^2 \left(192\, k\, T_0\, t_x\, r\, \Delta f_v\right)^{\frac{1}{2}}$$

INVENTORS
LEON RIEBMAN AND
BERNARD HAIMOWITZ, DECEASED
BY WILMA HAIMOWITZ, ADMINISTRATRIX

Busser, Smith & Harding
ATTORNEYS

United States Patent Office 3,182,266
Patented May 4, 1965

3,182,266
CRYSTAL DEMODULATING MEANS FOR ULTRA-HIGH RADIO FREQUENCIES

Leon Riebman, Huntingdon Valley, Pa., and Bernard Haimowitz, deceased, late of Whitemarsh Township, Montgomery County, Pa., by Wilma Haimowitz, administratrix, Lafayette Hill, Pa.; said Riebman assignor to American Electronic Laboratories, Incorporated, Lansdale, Pa., a corporation of Pennsylvania Filed Nov. 28, 1962, Ser. No. 240,700
2 Claims. (Cl. 329—162)

This invention relates to crystal diode means for the demodulation of ultrahigh radio frequency signals, and has particular reference to the increase of sensitivity of a crystal diode system used for direct detection.

This application is in part a continuation of application Serial No. 748,243, filed July 14, 1958, now abandoned.

Direct transformation by means of a crystal of a radio frequency input to a video output has various advantages in that, for example, it is adapted to broad radio frequency bands and does not involve radiation from a local oscillator as does a superheterodyne detection system. While much work has been done on crystal detectors for use as mixers for superheterodyne receivers, it has been quite generally assumed that proper optimum crystal conditions for mixer operation are also the proper conditions for crystals when used as demodulators of ultrahigh frequency signals. Actually, that is not the case. It is the general object of the present invention to provide crystal means for demodulation arranged to operate to secure maximum sensitivity.

The invention particularly relates to detectors for relatively narrow radio frequency band operation. The term "narrow band" as used herein refers to a band width of of the general order of 100 megacycles in the case of frequencies in the 500 megacycle to 100,000 megacycle range. While broad band detectors are desirable when the requirement is to pick up any signals within a very broad range of frequencies, narrow band detectors are desirable when the desire is to segregate signals falling within narrow frequency ranges. In such cases, the detectors may well be preceded by narrow band filters (preselectors), such narrow band filters actually restricting the pass band within the limits of even a narrow band detector. The present invention is particularly applicable to narrow band detectors since the optimizing of selectivity in the vicinity of one predetermined frequency tends to lessen the sensitivity at frequencies substantially above and below the design frequency but which are not so far removed that they would be considered as falling outside the range of a broad band detector. However, under some conditions of crystal choice and operation at particular frequency ranges the invention is quite applicable to what would be generally called broad band detectors, the distinction between broad and narrow bands being rather arbitrary.

Briefly, in accordance with the invention, the desired results are secured by providing a diode biasing current which is related to frequency and to measurable properties of a crystal as hereafter more fully pointed out.

The accomplishment of the objects of the invention will become apparent from the following description, read in conjunction with the accompanying drawing, in which:

FIGURE 1 is a diagram showing a demodulating means provided in accordance with the invention; and FIGURE 2 consists of a set of equations explanatory of the invention.

FIGURE 1 shows a typical detector arrangement to which the invention is applied. In physical form this may incorporate a crystal holder indicated at 2 which is of the type described in the application of Riebman and Jacobs, Serial No. 720,862, filed April 12, 1958, now abandoned. This crystal holder comprises a cylinder 4 of conductive metal which is coupled to a coaxial signal input feed cable indicated at 6 and provided with the central conductor 8, the sheath being conductively connected to the cylinder 4. Within the cylinder there is a central conductor 10 joined to the conductor 8 and providing a stub which is grounded to one end of the tube 4 as indicated at 12. A conductor 14 is associated with the tube 4 and a crystal cavity provides an impedance match to a rectifying semi-conductor crystal diode 16 which is specifically illustrated as having its cathode terminal connected to the conductor 14. The anode of the crystal diode has a capacitive connection at 18 to the cylinder 4 which in physical form may be provided by a thin sleeve of insulating material surrounding the conductive crystal housing within its mount. The anode of the crystal diode is connected to the central conductor of a coaxial video signal transmission line 20 the sheath of which is conductively connected to the cylinder 4. The video signal is fed through a capacitor 22 to the video amplifier which may be of any desired type and which is merely represented by a first stage tube 24.

The foregoing arrangement is such that from the standpoint of radio frequency signals the anode of the crystal diode is grounded to the cylinder 4 by the capacitance provided at 18. This capacitance is small and offers a relatively high impedance to the video signals which are effectively grounded at the cathode side of the diode through the conductors 14 and 10.

In accordance with the present invention, a bias current is applied to the diode to flow in the direction of forward current therethrough, and this bias is applied through a suitable high resistance 26 from the terminals 28 which may be supplied by a battery or other direct current source of suitable voltage. The forward resistance of the diode 16 is generally only moderately high (e.g. around 4000 ohms) and to maintain the biasing current constant it is desirable to use a relatively high resistance at 26 with a corresponding voltage supply at the terminals 28. This, then, produces a substantially constant biasing current irrespective of variations of diode resistance. At the same time, the use of a high resistance at 26 prevents loss of the video signal passing to the video amplifier.

It may be noted that the polarity of the diode illustrated is not essential; the diode may be polarized either way, the bias supply being suitably connected to provide the biasing current in the direction of forward current flow. It may also be noted that the particular crystal holder illustrated, while desirable, need not necessarily be used in accordance with the invention which is equally applicable to crystal holders of other known types. Required, however, is a direct current conductive path through the diode to provide the biasing current.

The present invention is particularly concerned with the provision of an optimum current to secure maximum sensitivity at a particular chosen frequency which may be that at which signals are to be received or which may be a frequency in the central or other region of a narrow band of signal frequencies to be received.

Defining threshold power, $P_{st}$, as the amount of radio frequency signal power required to just equal the noise power at the output of the video amplifier, it is found that, making certain well justified assumptions for simplification, the threshold power is given by the expression in Equation 1 of FIGURE 2 wherein:

$\alpha$ is approximately 39 volts$^{-1}$ at usual operating temperatures (300° K.);

$\omega$ is the angular radio frequency in radians per second;

$C_b$ is the barrier capacitance of the diode in farads;

$r$ is the spreading resistance, in ohms, in the semiconductor resulting from the constriction of current flow lines in the semiconductor near the contact;

$R_b$ is the nonlinear barrier resistance, in ohms, at the rectifying contact under conditions of use of the detector, i.e. with current flow in the forward direction;

$k$ is Boltzmann's constant;

$T_0$ is the ambient temperature in degrees K.;

$t_x$ is the crystal noise temperature in degrees K.; and $\Delta f_v$ is the video bandwidth in cycles per second.

It will be noted that the video band width is involved in the foregoing expression, and assuming that this is fixed by the nature of the signals to be received, it will be evident that there is no freedom of choice involved in optimizing the sensitivity by reduction of the threshold power required except by a choice of $R_b$ the barrier resistance of the crystal diode which may be changed by variation of a biasing current. The other quantities involved in the expression (1) are fixed by the choice of crystal or by operating conditions such as the radio frequency to be received and the ambient temperature. Crystals may, of course, be chosen for their best properties, but particular crystal design is not involved in the present invention.

(It may be here noted that the barrier capacitance also varies with bias current but the variation is a slow one and for practical purposes the barrier capacitance may be assumed constant.)

The derivation of Equation 1 may be outlined as follows:

Starting with the equivalent circuit of FIGURE 1, the maximum available video voltage is calculated. To determine noise an idealized noise spectrum is assumed with random phase of its components. Assuming the video bandwidth is equal to or less than the radio frequency bandwidth, only direct and difference frequency components need be considered. The latter are added powerwise for each cycle of the video band. Integration and simplification for a crystal video receiver gives an expression for the noise.

Combining the expressions for the video and noise signals to give the signal-to-noise ratio, this ratio appears as an expression in terms of power received at the antenna.

Then defining threshold sensitivity as the condition when the signal-to-noise ratio is unity, the threshold power $P_{st}$ is found.

Applying the aspects of an equivalent circuit in which $C_b$ and $R_b$ are in a parallel arrangement which is in series with a resistance $r$, and considering that the equivalent noise resistance of the amplifier can be neglected, and further neglecting a term small in comparison with unity, the expression (1) of FIGURE 2 is obtained.

Derived from Equation 1 is Equation 2 which gives the value of $R_b$ which should be provided at a particular frequency, expressed as angular frequency $\omega_0$, to give a minimum value of $P_{st}$ at this frequency, the optimum value of $R_b$ being expressed as $R_{b0}$. As appears from this equation, the optimum value of the barrier resistance is expressible in terms of the frequency at which maximum sensitivity is desired, the measured barrier capacitance of the diode and the measured spreading resistance thereof. Since from the particular crystal used the variation of the barrier resistance with forward biasing current will be known, Equation 2 serves for the ascertainment of the biasing current which should be used to secure the proper barrier resistance and hence the optimum sensitivity condition at the radio frequency chosen. This current may then be provided by the choice of a suitable high resistance 26 and a suitable voltage source, the resistance 26 having such a high value that the forward resistance of the diode is negligible in comparison with it.

While the optimum biasing current will vary from one crystal type to another, and even for individual crystals, if a group of them are not uniform, and will also vary with the frequency chosen for optimum sensitivity, it will be informative to cite a typical example to illustrate the general magnitude of the quantities involved.

Choosing a crystal of the type AEL 12 for optimum sensitivity at a frequency of 1000 megacycles, it was found that the barrier capacitance was 0.2 micromicrofarads and that the spreading resistance was 150 ohms. Applying Equation 2 this gave the optimum value of the barrier resistance as 2,778 ohms. For this particular crystal it was found that that value of barrier resistance would be attained by the use of a biasing current of ten microamperes. The direct resistance offered by the diode in a forward direction at this current value was found to be approximately 3000 ohms, and considering that a resistance at 26 at the input to the video amplifier was desirably in excess of 100,000 ohms, a resistance 26 of 4.7 megohms was chosen and a source of voltage at terminals 28 of 47 volts was used to provide the desired current to a sufficient degree of approximation for practical use.

Combining Equations 1 and 2, there may be derived the expression (3) for the threshold power required at any frequency $\omega$ in the general vicinity of the frequency given by $\omega_0$. Consideration of this last expression indicates that the threshold power required increases with $\omega$. The threshold power considered merely as a function of frequency does not reach a minimum at $\omega_0$, continuously increasing with frequency as in expression (1); but for a given crystal and video bandwidth it is a minimum at $\omega_0$ as compared with its value at the same frequency for other biasing currents. Thus there is achieved the optimizing of the threshold power at the chosen frequency.

It will be obvious that biasing currents in accordance with the invention may be provided in various fashions other than that illustrated without departing from the invention as defined in the following claims.

What is claimed is:

1. Means for the demodulation of ultrahigh radio frequency signals comprising a rectifying semiconductor crystal diode, means for applying the modulated radio frequency signals to said diode, means for delivering from said diode signals resulting from the demodulation, and means for applying a bias current through said diode in the direction of forward current flow to provide a barrier resistance $R_b$ approximately equal to $$\frac{1}{\omega_0^2 C_b^2 r}$$

wherein $\omega_0$ is the angular radio frequency of said radio frequency signals, in radians per second, at which optimum threshold power is desired, $C_b$ is the barrier capacitance of the diode in farads, and $r$ is the spreading resistance of the diode in ohms.

2. Means for the demodulation of ultrahigh radio frequency signals in accordance with claim 1 in which said bias current is applied from a voltage source through a high resistance.

References Cited by the Examiner

UNITED STATES PATENTS

| | | | |
|---|---|---|---|
| 2,100,458 | 11/37 | Walter | 329—205 |
| 2,810,829 | 10/57 | Schrock | 329—205 |
| 2,866,892 | 12/58 | Barton | 329—205 |
| 3,079,562 | 2/63 | Elliott | 329—205 |

ROY LAKE, *Primary Examiner.*